United States Patent [19]

Nagai et al.

[11] Patent Number: 5,148,487
[45] Date of Patent: Sep. 15, 1992

[54] AUDIO SUBBAND ENCODED SIGNAL DECODER

[75] Inventors: Kiyotaka Nagai; Yasushi Nakajima, both of Osaka, Japan

[73] Assignee: Matsushita Electric Industrial Co., Ltd., Osaka, Japan

[21] Appl. No.: 658,304

[22] Filed: Feb. 20, 1991

[30] Foreign Application Priority Data

Feb. 26, 1990 [JP] Japan .................................. 2-044906
Feb. 28, 1990 [JP] Japan .................................. 2-047590

[51] Int. Cl.$^5$ ............................................. H04L 1/00
[52] U.S. Cl. .......................................... 381/46; 371/31
[58] Field of Search ................ 381/46, 36, 31; 371/31

[56] References Cited

U.S. PATENT DOCUMENTS

| | | | |
|---|---|---|---|
| 4,802,171 | 1/1989 | Rasky | 371/31 X |
| 4,852,129 | 7/1989 | Schwartz | 381/31 X |
| 4,907,277 | 3/1990 | Callens et al. | 381/46 |
| 5,054,075 | 10/1991 | Hong et al. | 381/36 |

OTHER PUBLICATIONS

Theile et al, "Low bit-rate coding of high-quality audio signals—An Introduction to the MASCAM system", EBU Review-Technical No. 230, pp. 71-94, Aug. 1988.

*Primary Examiner*—Dale M. Shaw
*Assistant Examiner*—S. A. Melnick
*Attorney, Agent, or Firm*—Stevens, Davis, Miller & Mosher

[57] ABSTRACT

An audio subband encoded signal decoder which, when an error occurs in an audio subband encoded signal of a plurality of pieces of data, conceals the error in accordance with the contents of the data involving the error and the occurrence of the error in consideration of the degree of influence on a possible reproduced sound quality to thereby improve the sound quality.

3 Claims, 5 Drawing Sheets

AUDIO SUBBAND ENCODED SIGNAL DECODER

BACKGROUND OF THE INVENTION

1. Field of the Invention

The present invention relates to audio subband encoded signal decoders which conceal errors produced when a signal of low reliability is reproduced from a recording medium such as a tape or a disk where an audio subband encoded signal is recorded, or when a subband encoded signal is reproduced through a transmission system of low reliability.

2. Prior Art

Recently, audio subband signal encoders and decoders for decoding such encoded signals have attracted attention as devices which provide low bit rate coding of a high quality audio signal.

Conventional audio subband signal encoders and decoders are disclosed, for example, in an article entitled "LOW BIT-RATE CODING OF HIGH QUALITY AUDIO SIGNALS. AN INTRODUCTION TO MASCAM SYSTEM" by G. Theile et al., EBU REVIEW-TECHNICAL, No. 230, pp. 71-94, August 1988.

Conventionally, an audio subband signal encoder divides a received digital audio signal into a plurality of subband signals (16-32 subband signals corresponding to the critical band of a human ear characteristic), sections the respective subband signals into frames of a constant time interval of 5-20 ms, determines range data in accordance with the maximum signal level in a frame, reduces and compresses a quantity of data (the number of bits) by removing unnecessary components of a subband signal which a human being cannot hear on the basis of psychoacoustic rules in accordance with the input signal. To this end, it calculates bit allocation data indicative of the number of allocation bits of each subband signal, calculates sample data obtained by normalizing the respective subband signals with the maximum signal level determined by the range data, and quantizing them with the number of bits determined by the bit allocation data, calculates error detection and/or correction data for protection of the bit allocation data, range data and sample data against errors, and outputs synchronous data for synchronization of each frame, bit allocation data, range data, sample data and error detection correction data as a subband encoded signal.

Conventionally, an audio subband encoded signal decoder separates an input subband encoded signal to frames on the basis of synchronizing data, detects or corrects a possible error in the subband encoded signal using error detection and/or correction data, separates a signal in each frame into range and sample data in each subband on the basis of bit allocation data, resets the range or sample data where an uncorrectable error, if any, occurs, performs dequantization and denormalization using the separated range and sample data in each subband to obtain a subband signal, synthesizes those subband signals to reproduce and outputs a digital audio signal.

However, when an error occurs in the range data of a subband encoded signal, the decoder resets the range data in the subband where the error has occurred, so that the form of the frequency spectra of the audio signal reproduced by synthesizing the subband signals is disturbed to thereby greatly deteriorate the quality of the audio signal.

When an error occurs in the synchronizing data, and the subband encoded signal cannot be separated into frames, the range and sample data in the frame where the error has occurred is all reset, so that the level of the reproduced audio signal is greatly attenuated in the frame where the error has occurred to thereby greatly deteriorate the quality of the audio signal.

When an error occurs in the bit allocation data, and the subband encoded signal cannot be separated into respective subbands, the sample data in the frame where the error has occurred is all reset, so that the level of the reproduced audio signal is greatly attenuated in the frame where the error has occurred to thereby greatly deteriorate the quality of the audio signal.

SUMMARY OF THE INVENTION

It is an object of the present invention to provide an audio subband encoded signal decoder in which the quality of the audio signal is only slightly deteriorated when the subband encoded signal is reproduced using a low reliability recording medium or transmission system.

It is another object of the present invention to provide an audio signal subband encoded signal decoder which improves the sound quality when an error occurs, by concealing the error in consideration of the degree of influence exerted on the reproduced sound quality in accordance with the contents of the data where the error has occurred and the state of the occurring error in a subband encoded signal composed of a plurality of pieces of data.

In order to achieve the objects, the present invention provides an audio subband encoded signal decoder which decodes a subband encoded signal composed of frames including range data indicative of the maximum signal level of each frame, sample data indicative of signal data, and error detection and/or correction data to thereby reproduce an audio signal, comprising: a demultiplexer for separating the subband encoded signal, detecting or correcting an error, if any, in the encoded signal; and outputting, for each subband, sample data, range data, and a range data error flag and the range data error flag of a subband when there occurs an uncorrectable error in the range data of the subband; a range data interpolating unit for outputting the range data as it is from said demultiplexer, when there is no error in the range data of the current frame using a range data error flag for each subband; outputting, for each subband, the range data interpolated with the range data of the previous frame and the following frame, if there is an error in the range data of the current frame and no error in the range data of the following frame; and attenuating and outputting the level of the range data of the previous frame if an error has occurred in the range data of the current frame and the following frame; a dequantizer for performing, for each subband, dequantization and denormalization using sample data from said demultiplexer and range data from said range data interpolating unit; and outputting the signals of the frames of the respective subband; and a synthesis filter for synthesizing the signals of the frames of the respective subbands to reproduce an audio signal.

The present invention also provides an audio subband encoded signal decoder which decodes a subband encoded signal composed of frames including synchronizing data indicative of the end of a frame, range data, sample data, and error detection and/or correction data to thereby reproduce an audio signal, comprising; a demultiplexer for separating the subband encoded signal into frames; detecting or correcting an error in the subband encoded signal, separating and outputting the signal of each of the frames into range data and sample data of each subband; outputting the frame error flag indicative of the occurrence of errors over the entire frame and all range data error flags indicative of the occurrence of errors in the range data of the respective subbands and all these error flags are turned on when an error occurs in synchronizing data and the signal cannot be separated into frames; sample data interpolating unit for outputting sample data as it is from said demultiplexer for each of the subbands using a frame error flag in an error-free frame; and outputting sample data of the previous frame if a frame error flag in the current frame is turned on; a range data interpolating unit; a dequantizer; and a synthesis filter.

The present invention also provides an audio subband encoded signal decoder which decodes a subband encoded signal composed of frames including range data, sample data, bit allocation data indicative of the number of allocation bits of sample data of each subband and error detection and/or correction data to thereby reproduce an audio signal, comprising: a demultiplexer for separating the subband encoded signal into frames; detecting or correcting an error, if any, in the encoded signal; separating and outputting the signal of each frame into range data of each subband and sample data of that subband on the basis of bit allocation data; outputting a frame error flag indicative of the occurrence of an error over the entire frame where the sample data cannot be separated into signal data of the respective subbands and the frame error flag is turned on when an uncorrectable error occurs in the bit allocation data; and outputting a range data error flag indicative of the occurrence of an error in the range data in each subband, and the range data error flag of an unseparable subband is turned on when the range data cannot be separated into subbands; a sample data interpolating unit; a range data interpolating unit; a dequantizer; and a synthesis filter.

Thus, in the inventive audio subband encoded signal decoder, when an uncorrectable error occurs in the range data of the current frame, the range data interpolating unit outputs, for each subband, the range data interpolated with range data of the previous frame and the following frame, if the occurrence of errors is sporadic and there is no error in the range data of the following frame, in accordance with the state of the occurring errors, to thereby smoothly connect the frequency spectra of the reproduced audio signal in the direction of time axis. If errors occur successively and errors occur in the range data of the current frame and the following frame, the level of the range data of the previous frame is attenuated and then output to thereby fade out the level of the reproduced audio signal with time and hence to prevent the occurrence of a pulsating noise and suppress a deterioration in the quality of the reproduced audio signal.

When an error occurs in the synchronizing data, and a frame error occurs to thereby disable the separation of each subband signal in each frame, the sample data interpolating unit outputs, in the current frame where the error has occurred, the sample data of the previous frame to thereby smoothly connect the frequency spectra of the reproduced audio signal in the direction of time axis. If errors occur successively and errors occur in the range data of the current frame and the following frame, the level of the range data of the previous frame is attenuated and then output to thereby fade out the level of the reproduced audio signal with time and hence to prevent the occurrence of a pulsating noise and suppress a deterioration in the quality of the reproduced audio signal when a frame error has occurred.

Furthermore, when uncorrectable errors occur in the bit allocation data and range data or sample data cannot be separated into subbands, a deterioration in the quality of the reproduced audio signal can similarly be suppressed using the sample data interpolating unit and range data interpolating unit.

DESCRIPTION OF THE PREFERRED EMBODIMENT

Figure 1:
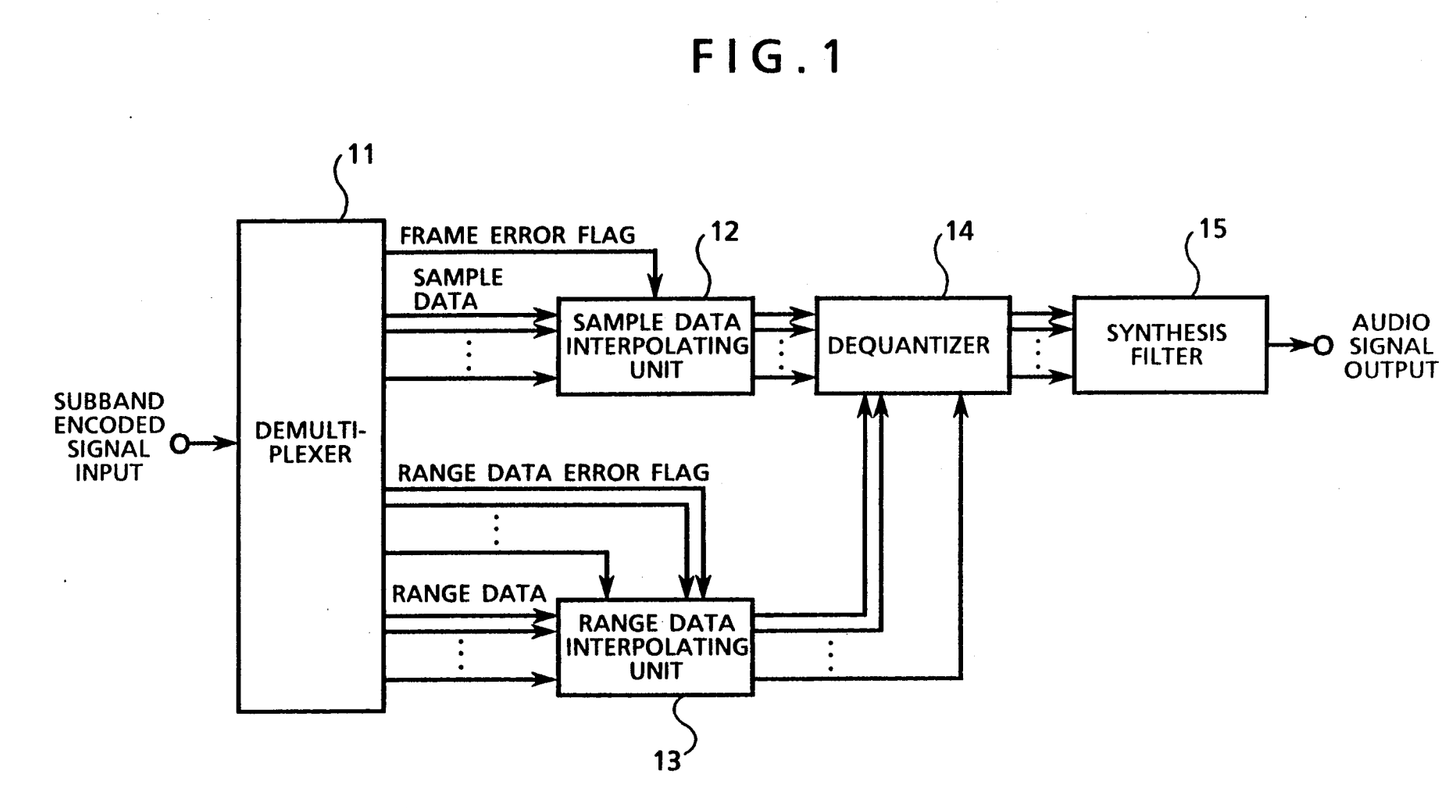
FIG. 1 is a block diagram of an audio subband signal decoder of an embodiment of the present invention.

FIG. 1 is a block diagram of an audio subband encoded signal decoder of an embodiment of the present invention. In FIG. 1, the numeral 11 denotes a demultiplexer; 12, a sample data interpolating unit; 13, a range data interpolating unit; 14, a dequantizer; and, 15, a synthesis filter. In FIG. 1, the plurality of arrows indicates that there are a like number of subbands.

Figure 2:
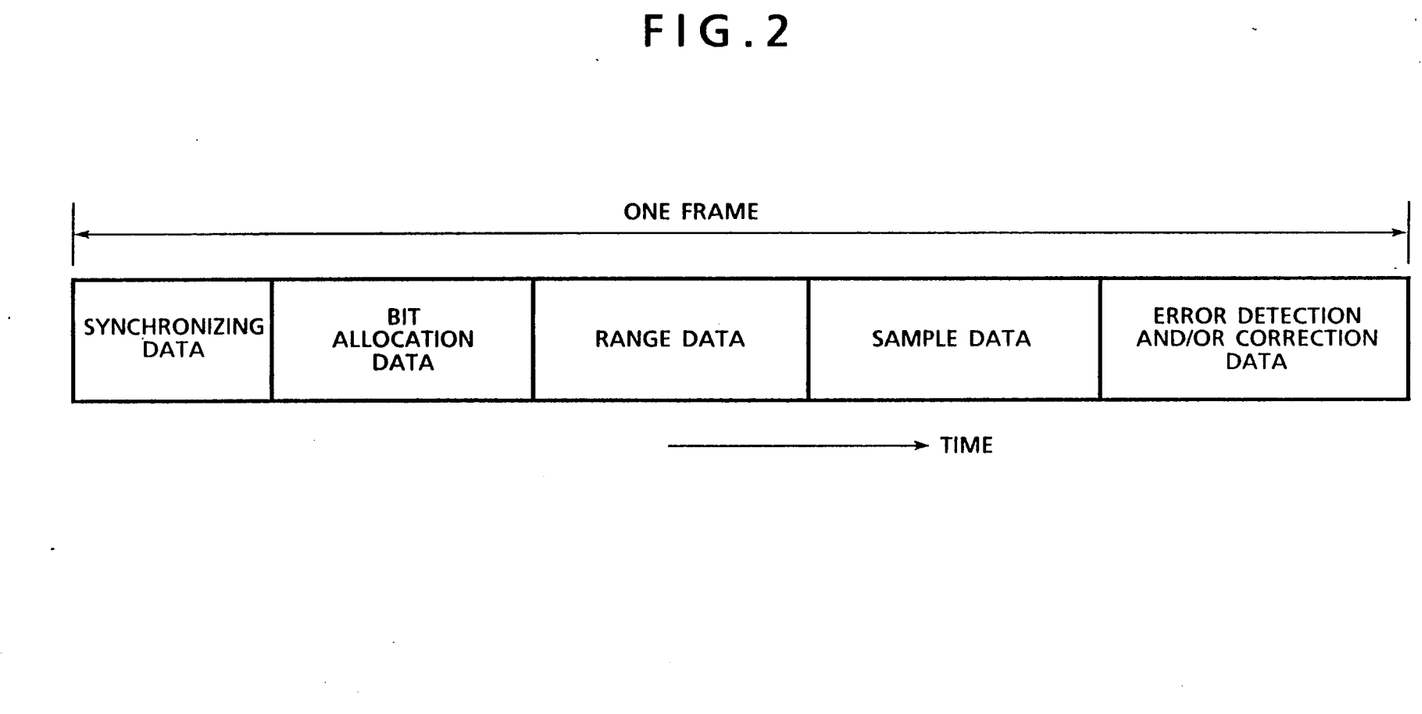
FIG. 2 illustrates the format of a signal of one frame of a subband encoded signal.

In operation, a subband encoded signal which is reproduced from a recording medium or which has passed through a transmission system is input to demultiplexer 11. The structure of the subband encoded signal will be described with reference to FIG. 2 which shows the format of a signal in one frame of a subband encoded signal used in the audio subband encoded signal decoder according to the present invention. The actual subband encoded signal is obtained by repeating the format of the signal in one frame shown in FIG. 2. As shown in FIG. 2, the head of the subband encoded signal in one frame is synchronizing data for synchronization of frames.

Pieces of bit allocation data indicative of the number of allocation bits of the sample data of each subband and equal in number of subbands are arranged in the order of a subband of a low frequency to a subband of higher frequency.

A plurality of pieces of range data each indicative of the maximum signal level in a frame of a subband signal and equal in number to the subbands are arranged in the order of a subband of a low frequency to a subband of a higher frequency, like the pieces of bit allocation data. It should be noted that no range data is sent for a subband where the number of allocation bits is 0 for bit reservation.

Table 1 shows the relationship between range data and maximum signal level, and expresses the maximum levels of frame signals of 16 bits including positive and negative signs or of 15 bits of an absolute value (dynamic range of 90.309 dB) for 0–60 pieces of range data one differing from the other by about 1.5 dB. In this case, the range data is expressed by 6 bits for each subband. The range data indicates a maximum signal level expressed on logarithmic scale.

TABLE 1

| range data | maximum signal level (dB) |
|---|---|
| 60 | 90.309 |
| 59 | 88.804 |
| 58 | 87.299 |
| . | . |
| . | . |
| . | . |
| 4 | 6.021 |
| 3 | 4.515 |
| 2 | 3.010 |
| 1 | 1.505 |
| 0 | 0.000 |

Pieces of sample data each indicative of the signal data of a subband signal and equal in number to the signal data of all subband constituting one frame are arranged in the order of a subband of a low frequency to a subband of a higher frequency for the first signal data of the frames. In a similar sequence, the second signal data are arranged. Similarly, all signal data constituting one frame are arranged.

In order to protect against errors occurring in the subband encoded signal, pieces of error detection and/or correction data for bit allocation data, range data and sample data are arranged. The error detection and/or correction data includes, for example, a Reed-Solomon code used for CDs and DATs.

Demultiplexer 11 demultiplexes a subband encoded signal obtained from a recording medium or a transmission system in accordance with synchronizing data, detects or corrects a possible error involved in the bit allocation data, range data and sample data in accordance with error detection and/or correction data, divides a signal of each frame into range data of each subband and sample data of that subband in accordance with bit allocation data and outputs the result. When there occurs an uncorrectable error in the range data or the range data cannot be separated into subbands, a range data error flag of the corresponding subband is turned on and output. When the sample data cannot be separated into subbands, a frame error flag is turned on and output.

Figure 3:
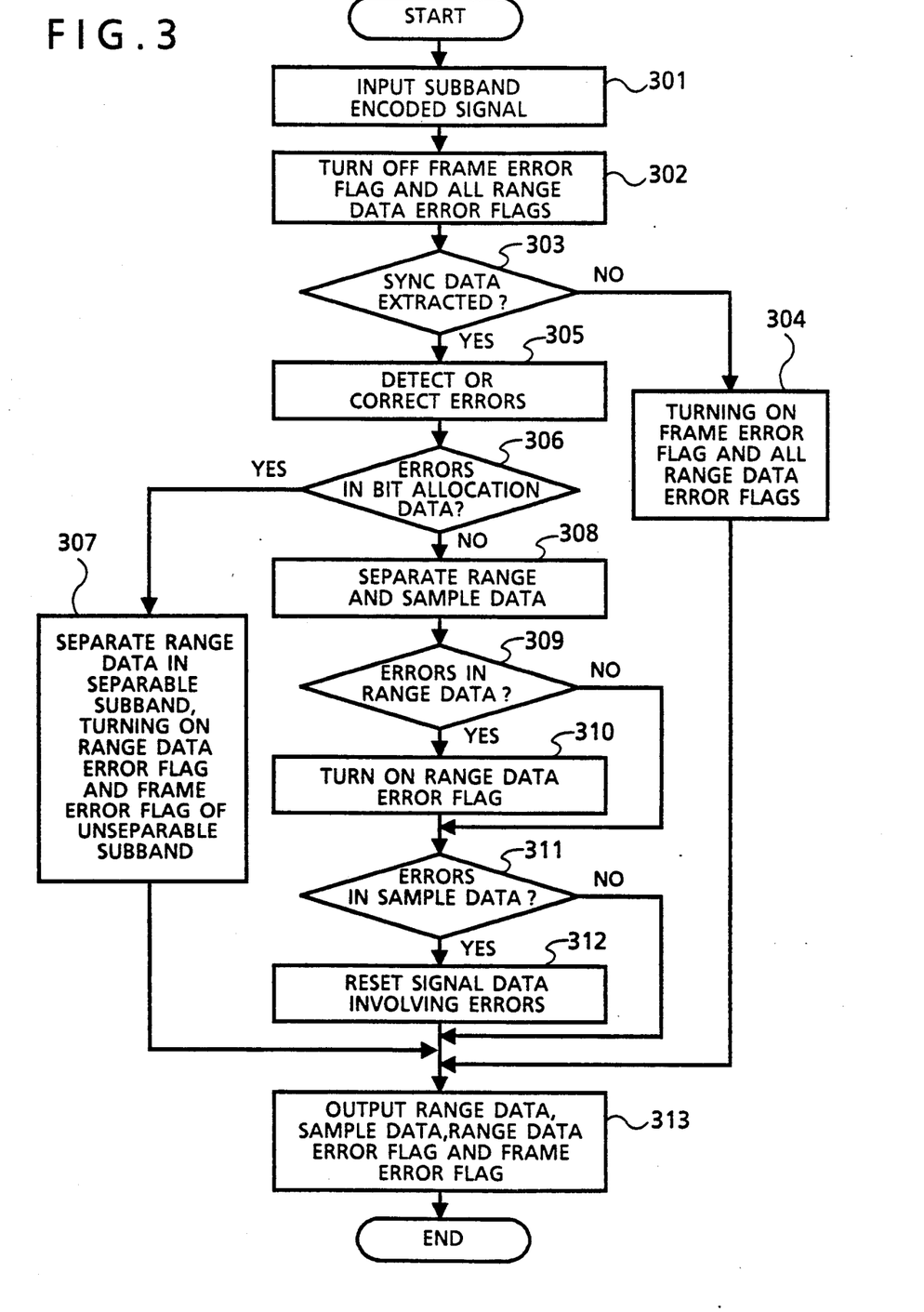
FIG. 3 is a flowchart indicative of the processing for one frame by a demultiplexer.

FIG. 3 is a flowchart of the processing for one frame by demultiplexer 11. The operation of the demultiplexer 11 will be described in more detail with reference to FIG. 3.

At step 301 a subband encoded signal is input to demultiplexer 11.

At step 302 the frame error flag and all the range data error flags are turned off for initializing the error flags.

At step 303, synchronizing data is extracted from the subband encoded signal. When synchronizing data cannot be extracted due to the occurrence of an error, and the subband encoded signal cannot be divided into frames, processing at step 304 is performed. If otherwise, processing at step 305 is performed. When one error occurs in the synchronizing data, processing may be performed by regarding the synchronizing data as existing in a time predicted from the previous synchronizing data and the period of the frame using the periodicity of the synchronizing data. In this case, the processing at step 305 is performed.

At step 304, the frame error flag indicative of the occurrence of an error through the entire frame and all the range data error flags each indicative of the occurrence of an error in the range data of each subband are turned on and then the processing at step 313 is performed.

At step 305, errors are detected or corrected using error detection and/or correction data. When an uncorrectable error occurs in the bit allocation data, range data or sample data, the position of the data where the error has occurred is stored.

At step 306, it is checked on the basis of the result of the processing at step 305 whether there has occurred an uncorrectable error in the bit allocation data. If so and if the sample data cannot be divided into signal data of the respective subbands and if the range data cannot be divided into subbands, processing at step 307 is performed. If otherwise, processing at step 308 is performed.

At step 307, the range data of a subband which is separable into subbands is separated in accordance with bit allocation data where no errors have occurred. The range data error flag of the inseparable subband and the frame error flag are turned on and processing at step 313 is then performed. As described above, the range data ordinarily requires 6 bits for each subband. No range data is delivered for a subband where the number of allocation bits is 0, so that if there occurs an error in the bit allocation data, the range data of subbands of frequencies higher than those of the subband where the error has occurred cannot precisely be separated. Thus, the range data error flag of that subband is turned on. In the case of a subband encoded signal which delivers range data for a subband where the number of allocation bits is 0, only a range data error flag for a subband where the error has occurred in the bit allocation data is turned on and output. Similarly, for sample data, the first signal data of a subband of frequencies lower than those of the subband where the error has occurred can be separated, but it is not separated here and the frame error flag is turned on and output because the sound quality is only slightly influenced.

At step 308 the range data is separated into pieces of range data of the subbands and the sample data is separated into pieces of signal data of the subbands in accordance with bit allocation data.

At step 309 it is checked on the basis of the result of processing at step 305 whether an uncorrectable errors have occurred in the range data. If such error has occurred in the range data of each subband, processing at step 310 is performed. If not, control jumps to step 310.

At step 310, a range data error flag corresponding to the range data of the subband where the error has occurred is turned on.

At step 311 it is checked on the basis of the result of processing at step 305 whether an uncorrectable error has occurred in the sample data. If so, processing at step 312 is performed. If not, control jumps to step 313.

At step 312 the signal data of the subband where the error has occurred is replaced with 0 and the sample data is output. For the sample data, the sound quality is less influenced by an occurring error than range data is so that such simple processing will suffice. Sample data where the error has occurred is interpolated when it has passed through a band-pass filter of synthesis filter 15, so that the sound quality is only slightly influenced.

At step 313 the range data, sample data, range data error flag and frame error flag are output.

Demultiplexer 11 may be composed, for example, of a digital signal processor.

Sample data interpolating unit 12 outputs one-frame sample data as it is from demultiplexer 11 in an error-free frame, for each subband using the sample data of each subband from demultiplexer 11 and the frame error flag, and repeatedly outputs the ample data of a frame directly preceding a frame where an error has occurred.

Figure 4:
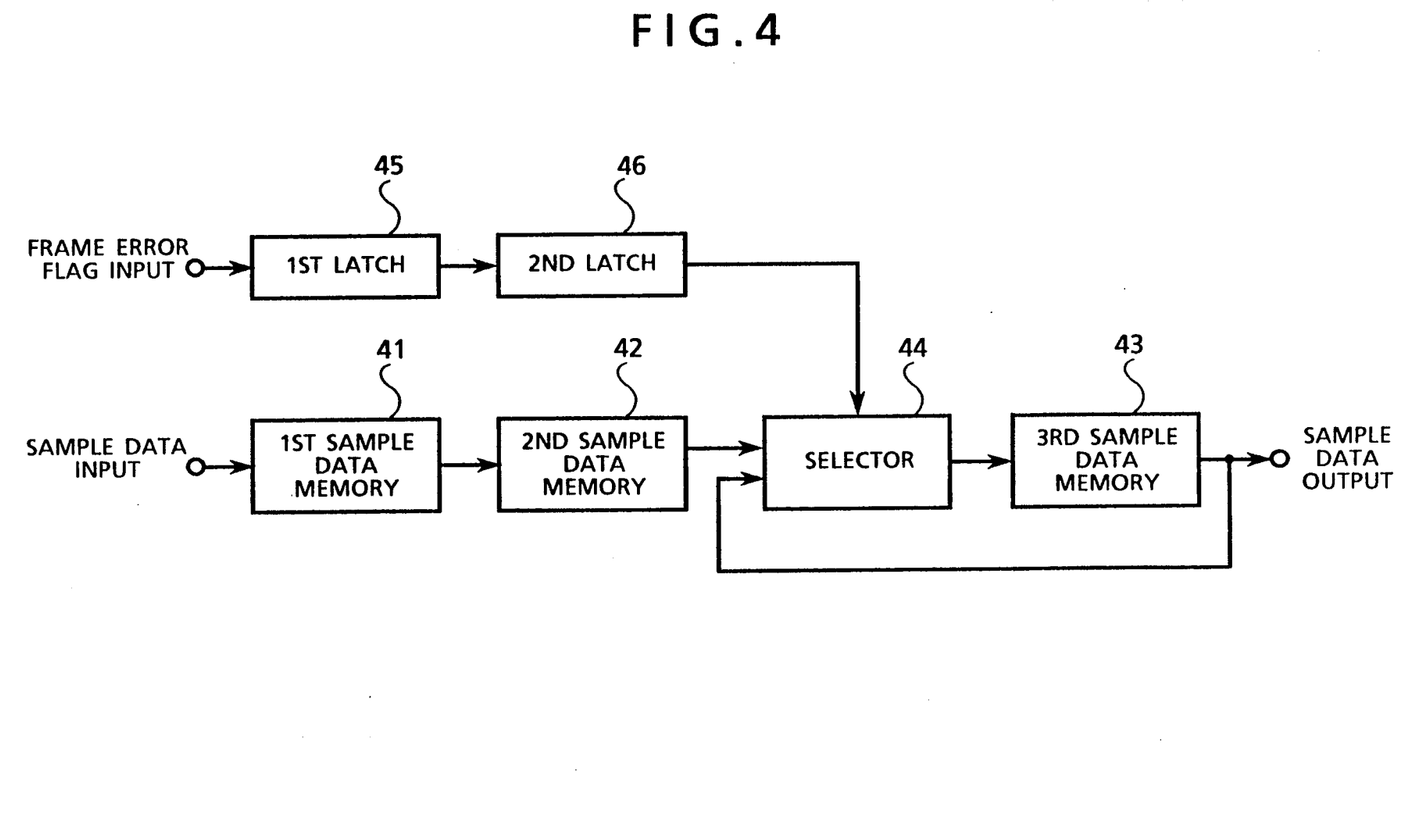
FIG. 4 illustrates the internal structure of a sample data interpolating unit for each subband.

The operation of sample data interpolating unit 12 will below be described in more detail with reference to FIG. 4. FIG. 4 illustrates the internal structure, for each subband, of sample data interpolating unit 12, which includes FIG. 4—subband structures the number of which equals the number of subbands. In FIG. 4, the numeral 41 denotes a first sample data memory; 42, a second sample data memory; 43, a third sample data memory; 44, a selector; 45, a first latch; and 46, a second latch. First, second and third sample data memories 41, 42, 43 each store sample data for one frame, the sample data shifting compared to another by a time for one frame. First and second latches 45 and 46 store a frame error flag which shift compared to each other by a time for one frame.

Sample data from demultiplexer 11 is input to first sample data memory 41 while a frame error flag is input to first latch 45. The contents of first sample data memory 41 are transferred to second sample data memory 42 at a timing synchronous with a frame. Similarly, the contents of first latch 45 are transferred to second latch 46 at a timing synchronous with a frame. Selector 44 selects and outputs the contents of second sample data memory 42 when there are no errors in second sample data memory 42 and selects and outputs the contents of third sample data memory 43 when there occur errors, using a frame error flag from second latch 45, and transfers the output to third sample data memory 43 at a timing synchronous with a frame. Third sample data memory 43 outputs sample data to dequantizer 14 and selector 44. While in FIG. 4 first and second latches 45 and 46 are illustrated as being provided for each subband for convenience of explanation, this applies to every subband, so that only one subband may have such latches such that a frame error flag is supplied from that subband to any other subband.

Range data interpolating unit 13 outputs range data as it is, if there is no error in the range data of the current frame using range data of each subband and range data error flag from demultiplexer 11. In a current frame where the error has occurred, it outputs range data interpolated with range data of the previous frame and the following frame when there is no error in the range data of the following frame. If errors occur in the range data of the current frame and the following frame, the level of the range data of the previous frame is attenuated and output.

Figure 5:
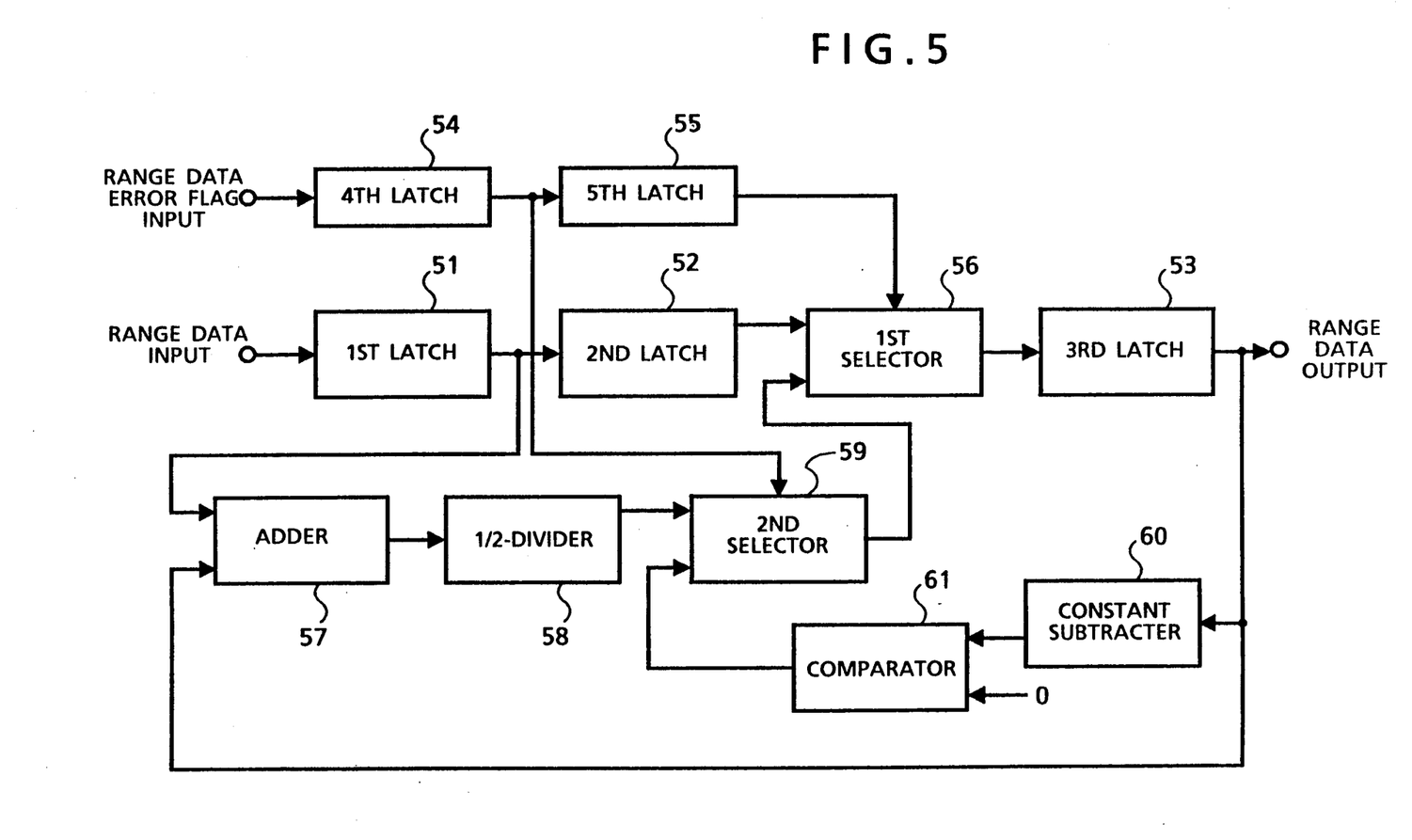
FIG. 5 illustrates the internal structure of a range data interpolating unit for each subband.

The operation of range data interpolating unit 13 will be described in more detail with reference to FIG. 5. FIG. 5 shows the internal structure of range data interpolating unit 13 for each subband. Range data interpolating unit 13 includes subband structures equal in number to the subbands. In FIG. 5, the numerals 51, 52, 53, 54 and 55 denote a first, second, third, fourth and fifth latches, respectively; 56, first selector; 57, an adder; 58, ½-divider; 59, second selector; 60, a constant subtracter; and 61, a comparator.

First, second and third latches 51, 52, 53 each are a 6-bit latch and store range data, of the following the current and the previous frame respectively, the range data stored by one latch shifting compared to that stored by another by a time corresponding to one frame. Fourth and fifth latches 54 and 55 each are a 1-bit latch to store a range data error flag of the following and the current frame respectively, one range data error flag stored by one latch shifting compared to the stored by the other latch by a time corresponding to one frame. Range data from demultiplexer 11 is input to first latch 51, and a range data error flag is input to fourth latch 54. The contents of first latch 51 are transferred to second latch 52 at a timing synchronous with a frame. Similarly, the contents of fourth latch 54 are transferred to fifth latch 55 at a timing synchronous with a frame. First selector 56 selects the output of second latch 52 when there is no error in the range data stored in second latch 52 and selects the output of second selector 59 when there occurs an error, using the range data error flag stored in fifth latch 55, and transfers the output to third latch 53 at a timing synchronous with a frame. Third latch 53 outputs range data to dequantizer 14, adder 57 and constant subtracter 60. Adder 57 adds the outputs of first and third latches 51 and 53. The ½-divider 58 divides the output of adder 57 by a factor of 2. It may include a 1-bit shifter. Adder 57 and ½-divider 58 perform an average value interpolating operation using range data in the frames directly before and directly after the current frame. As mentioned above, since the range data is expressed on logarithmic scale, the average value interpolation of the range data means logarithmic scale interpolation. Constant subtracter 60 subtracts a constant, for example of 4, from the output of third latch 53 to thereby logarithmically attenuate the level of the range data output preceding by one frame. The "4" of the range data corresponds to about 6 dB, as will be seen from Table 1, so that the signal level is attenuated by about 6 dB. Comparator 61 compares 0 and the output of constant subtracter 60 and outputs the larger one to thereby maintain the output of comparator 61 at 0 or more at all times. Second selector 59 selects and outputs the interpolated value from ½-divider 58 when the occurrence of errors is sporadic and the range data stored in first latch 51 from demultiplexer 11 is not an error. It selects and outputs the attenuated range data from comparator 61 when errors successively occur and an error occurs in the range data stored in first latch 51 and second latch 52.

Dequantizer 14 performs dequantization and denormalization, using sample data output from sample data interpolating unit 12 and range data output from range data interpolating unit 13 for each subband, and reproduces a signal of each of the frames of each subband. Dequantizer 14 may include a digital signal processor as disclosed in the reference mentioned before.

Synthesis filter 15 includes a plurality of band-pass filters and synthesizes signals of the respective frames of each subband from dequantizer 14 into a digital audio signal and then output it. Synthesis filter 15 may include a digital signal processor as disclosed in the reference mentioned above.

As described above, according to the present invention, when there occurs an uncorrectable error in a subband encoded signal including synchronizing data, bit allocation data, range data and sample data, concealment suitable for the contents of the data involving the error or conforming to the state of the occurring error is performed to thereby improve the sound quality at the time.

According to the present invention, when there occurs an uncorrectable error in the range data, the range data interpolating unit outputs, for each subband, the range data interpolated with the range data of the previous frame and the following frame if the error occurred in the range data of the current frame, in accordance with the state of the error, when the occurrence of the error is. Sporadic and there is an error in the range data of the current frame and no error in the range data of the following frame to thereby smoothly connect the frequency spectra of the reproduced audio signal in the direction of time axis. If the occurrence of errors are successive and there is an error in the range data of the current frame and the following frame, the level of the range data of the previous frame is attenuated and output to thereby fade out the reproduced audio signal, to prevent the occurrence of pulsating noise and to reduce a deterioration in the quality of the reproduced audio signal when the error has occurred.

According to the present invention, if an error occurs in the synchronizing data and signals cannot be separated into the respective frames, the sample data interpolating unit outputs the sample data of the frame preceding the frame where the error has occurred for each subband using a frame error flag, when the occurrence of the errors is sporadic and there is no synchronization data error in the frame just after the frame where the error occurred the range data interpolating unit outputs, for each subband, the range data interpolated with the range data directly before and after the frame where the error occurred, using the range data error flag for each subband, to thereby smoothly connect the frequency spectra of the reproduced audio signal in the direction of time axis. If the occurrence of the errors are successive and there occur errors also in the frame just after the frame where the errors have occurred, the level of the range data just before the frame where the errors have occurred is attenuated and output to thereby fade out the reproduced audio signal, to prevent the occurrence of pulsating noise and to reduce a deterioration in the quality of the reproduced audio signal when the errors have occurred.

According to the present invention, if an uncorrectable errors occur in the bit allocation data, and the range data or sample data cannot be separated into the subbands, a deterioration in the quality of the reproduced audio signal is similarly suppressed using the sample data interpolating unit and range data interpolating unit.

What is claimed is:

1. An audio subband encoded signal decoder which decodes a subband encoded signal composed of frames including range data indicative of the maximum signal level of each frame, sample data indicative of signal data, and error detection and/or correction data to thereby reproduce an audio signal, comprising:
   a demultiplexer for separating the subband encoded signal, detecting or correcting an error, if any, in the encoded signal; and outputting, for each subband, sample data, range data, a range data error flag indicative of an uncorrectable error in the range data of that subband;
   a range data interpolating unit for outputting the range data as it is from said demultiplexer, if there is no error in the range data using a range data error flag for each subband; outputting the range data interpolated with the range data of the previous frame and the following frame, if there is an error in the range data of the current frame and no error in the range data of the following frame; and attenuating and outputting the level of the range data of the previous frame if there is an error in the range data of the current frame and the following frame;
   a dequantizer for performing, for each subband, dequantization and denormalization using sample data from said demultiplexer and range data from said range data interpolating unit; and outputting the signals of the frames of the respective subbands; and
   a synthesis filter for synthesizing the respective signals of the frames of the subbands to reproduce an audio signal.

2. An audio subband encoded signal decoder which decodes a subband encoded signal composed of frames including synchronizing data indicative of the end of a frame, range data indicative of the maximum signal level of the signal in that frame, sample data indicative of signal data, and error detection and/or correction data to thereby reproduce an audio signal, comprising:
   a demultiplexer for separating the subband encoded signal into frames; detecting or correcting an error in the subband encoded signal, separating and outputting the signal of each of the frames into range data and sample data of each subband; and outputting a frame error flag indicative of the occurrence of errors over the entire frame and all range data error flags indicative of the occurrence of errors in the range data of the respective subbands, and these error flags are all turned on when an error occurs in synchronizing data and the encoded signal cannot be separated into frames;
   sample data interpolating unit for outputting sample data as it is from said demultiplexer for each of the subbands using a frame error flag in an error-free frame; and outputting, for each subband, sample data of the previous frame when an error has occurred in the current frame;
   a range data interpolating unit for outputting range data as it is from said demultiplexer, if there is no error in the range data of the current frame using a range data error flag for each subband; outputting, for each subband, range data interpolated with range data of the previous frame and the following frame if there is an error in the range data of the current frame and no error in the range data of the following frame; and attenuating and outputting the level of the range data of the previous frame if there is an error in the range data of the current frame and the following frame;
   a dequantizer for performing dequantization and denormalization using sample data from said sample data interpolating unit and range data from said range data interpolating unit for each subband; and outputting the signal of the frames of the respective subbands; and
   a synthesis filter for synthesizing the signals of the frames of the respective subbands to reproduce an audio signal.

3. An audio subband encoded signal decoder which decodes a subband encoded signal composed of frames including range data indicative of the maximum signal level of the signal of each frame, sample data indicative of signal data, bit allocation data indicative of the number of allocation bits of sample data of each subband and error detection and/or correction data to thereby reproduce an audio signal, comprising:
   a demultiplexer for separating the subband encoded signal into frames; detecting or correcting an error, if any, in the encoded signal; separating and outputting the signal of each frame into range data of each subband and sample data of signal data of that subband on the basis of bit allocation data; outputting a frame error flag indicative of the occurrence of an error over the entire frame where the sample data cannot be separated into signal data of the respective subbands, and the frame error flag is turned on when an uncorrectable error occurs in the bit allocation data; and outputting a range data error flag indicative of the occurrence of an error in the range data for each subband, and the range data error flag is turned on when the range data cannot be separated into subbands;

a sample data interpolating unit for outputting sample data as it is from said demultiplexer in an error-free frame for each subband using a frame error flag; and outputting, for each subband, sample data of the previous frame when an error has occurred in the current frame;

a range data interpolating unit for outputting range data as it is from said demultiplexer if there is no error in the range data of the current frame using a range data error flag for each subband; outputting, for each subband, the range data interpolated with the range data of the previous frame and the following frame, if there is an error in the range data of the current frame and no error in the range data of the following frame; and attenuating and outputting the level of the range data of the previous frame if there is an error in the range data of the current frame and the following frame;

a dequantizer for performing dequantization and denormalization using sample data from said sample data interpolating unit and range data from said range data interpolating unit for each subband; and outputting the signals of the frames of the respective subbands; and a synthesis filter for synthesizing the signals of frames of the respective subband to reproduce an audio signal.

* * * * *